United States Patent
Minechika et al.

(10) Patent No.: US 6,992,956 B2
(45) Date of Patent: Jan. 31, 2006

(54) DISK REPRODUCING APPARATUS FOR PRECISELY DETERMINING A VALUE OF AN ADDRESS SIGNAL REPRODUCED FROM THE DISK

(75) Inventors: Shigekazu Minechika, Osaka (JP); Koichi Tada, Gifu (JP); Takashi Onaka, deceased, late of Osaka (JP); by Junko Onaka, legal representative, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 41 days.

(21) Appl. No.: 10/275,961

(22) PCT Filed: Apr. 23, 2001

(86) PCT No.: PCT/JP01/03490

§ 371 (c)(1),
(2), (4) Date: May 28, 2003

(87) PCT Pub. No.: WO01/88907

PCT Pub. Date: Nov. 22, 2001

(65) Prior Publication Data

US 2004/0027944 A1 Feb. 12, 2004

(30) Foreign Application Priority Data

May 19, 2000 (JP) .................................. 2000-147202

(51) Int. Cl.
*G11B 7/005* (2006.01)

(52) U.S. Cl. .............................. 369/47.25; 369/44.36; 369/47.17; 369/47.22; 369/53.33

(58) Field of Classification Search ............ 369/44.35, 369/44.36, 47.17, 47.22, 53.33, 59.15, 59.17, 369/47.25
See application file for complete search history.

(56) References Cited

U.S. PATENT DOCUMENTS

| 5,412,632 | A | 5/1995 | Mita et al. | |
|---|---|---|---|---|
| 6,522,605 | B1 * | 2/2003 | Tada et al. | 369/44.26 |
| 6,614,740 | B1 * | 9/2003 | Park et al. | 369/59.17 |
| 2001/0012250 | A1 * | 8/2001 | Takemura et al. | 369/44.29 |

FOREIGN PATENT DOCUMENTS

| JP | 03-235271 | 10/1991 |
|---|---|---|
| JP | 5 -258379 | 10/1993 |
| JP | 07-161147 | 6/1995 |
| JP | 8-315369 | 11/1996 |
| JP | 10-208250 | 8/1998 |
| JP | 10-269649 | 10/1998 |
| JP | 11-25461 | 1/1999 |
| JP | 11-025475 | 1/1999 |
| JP | 11-306686 | 11/1999 |
| JP | 2001-67665 | 3/2001 |
| JP | 2001-67743 | 3/2001 |
| JP | 2001-93172 | 4/2001 |
| WO | WO98/54703 | 12/1998 |

* cited by examiner

Primary Examiner—W. R. Young
Assistant Examiner—Lixi Chow
(74) Attorney, Agent, or Firm—Westerman, Hattori, Daniels & Adrian, LLP

(57) ABSTRACT

A disk reproducing apparatus includes a variable gain amplifier (VCA) (32), and the VCA applies a radial push-pull signal including an address signal and an FCM leakage-in signal to a switch (38). The switch outputs only the address signal to a peak-hold circuit (40) on the basis of an FCM mask signal from a mask signal generation circuit (36). The peak-hold circuit generates a peak-hold signal of the address signal so as to be output to a DSP (30), and the DSP controls a gain of the VCA on the basis of the peak-hold signal. Then, the radial push-pull signal in which the gain is controlled on the basis of the address signal is applied to an address detection circuit (42), and the address signal is detected therein.

5 Claims, 8 Drawing Sheets

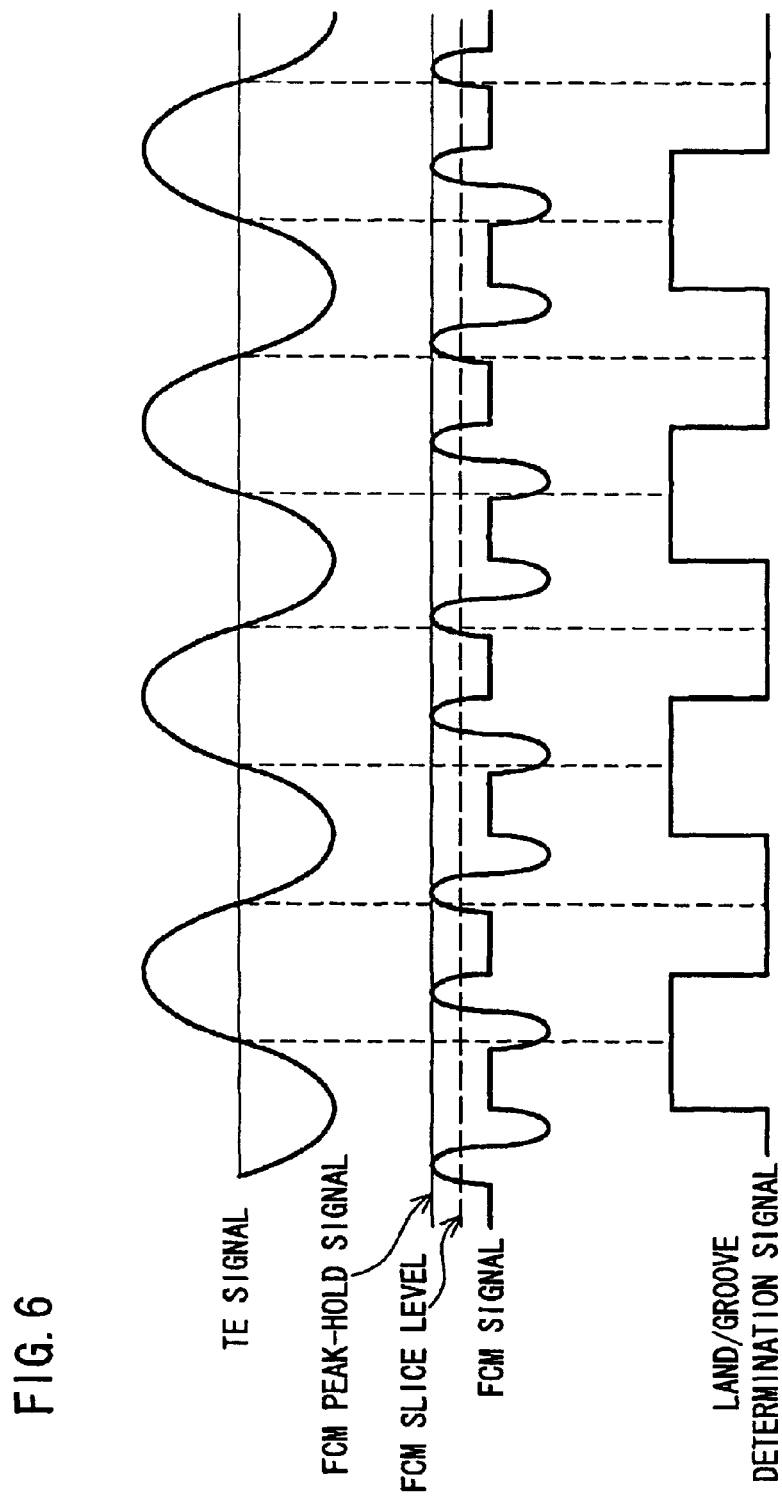

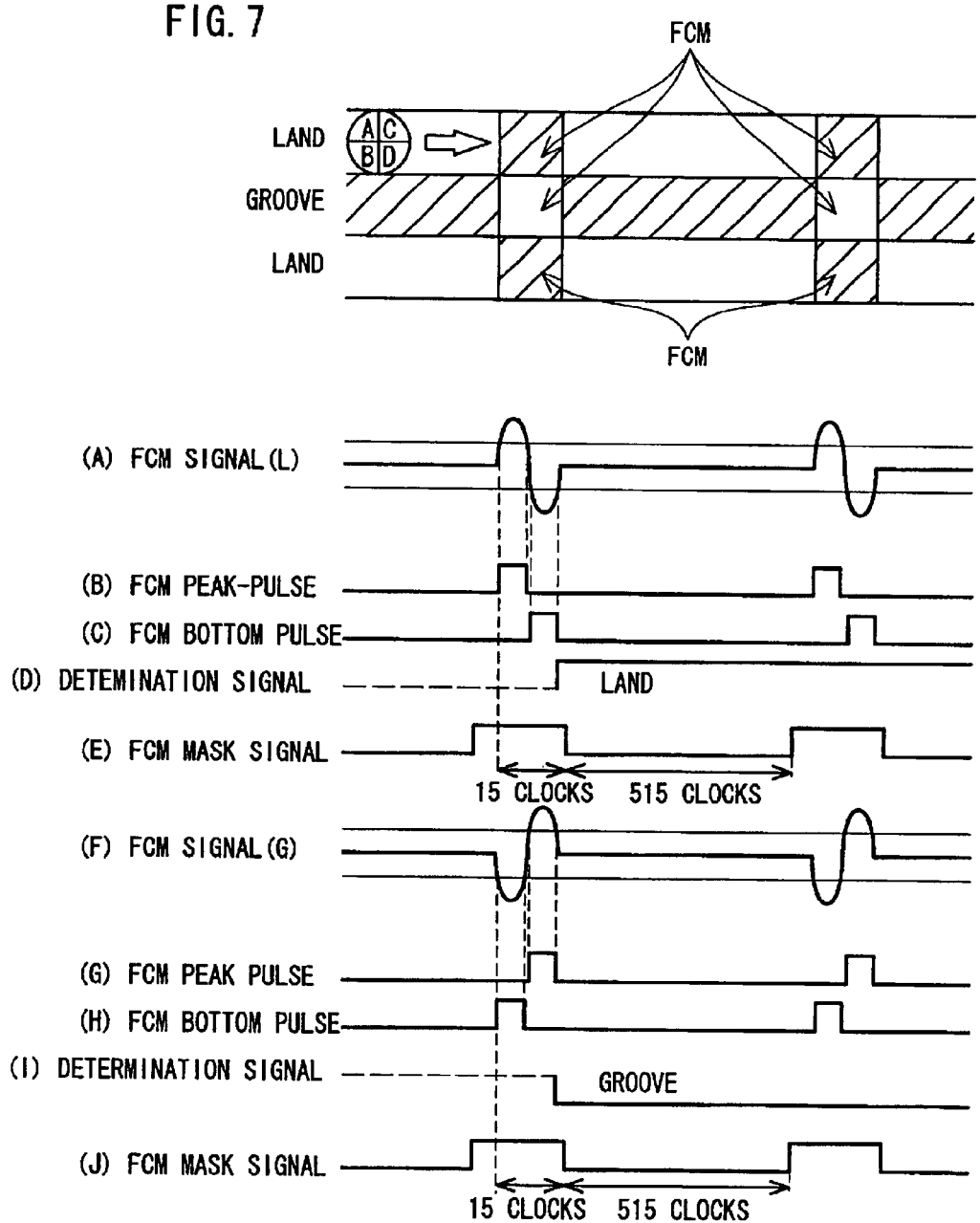

DISK REPRODUCING APPARATUS FOR PRECISELY DETERMINING A VALUE OF AN ADDRESS SIGNAL REPRODUCED FROM THE DISK

TECHNICAL FIELD

The present invention relates to a disk reproducing apparatus. More specifically, the present invention relates to a disk reproducing apparatus capable of reproducing a disk formed and recorded with an address signal and a predetermined signal along a track.

PRIOR ART

A magneto optical disk such as an AS-MO (Advanced Storage Magneto Optical Disk) is formed with land tracks and groove tracks along each of which an FCM (Fine Clock Mark) signal and an address signal are formed and recorded. More specifically, the FCM signal is recorded every one segment as shown in FIG. 9, and the address signal is recorded every one frame (38 segments).

FIG. 10 shows a formed and recorded state of the FCM signal and the address signal. According to FIG. 10, the land track is formed in a concave shape, and the groove track is formed in a convex shape. Then, the land track and the groove track are formed with FCM signals having a concave and a convex reverse to respective tracks. As shown in FIG. 10, a boundary surface between the land track and the groove track is provided with an address portion having a boundary line waving in a width direction of the track. The waveform constructing the address portion has a half width of the track. Accordingly, if the land track or the groove track is traced, the concave and convex of the track is reversed along the waveform at the address portion, and the change of the concave and convex represents an address. Although each of the concave and the convex at the address portion indicates "0" or "1", a correspondence between the concave and convex and the "0" and "1" is reversed between the land track and the groove track.

Herein, although a value of the recorded address signal is determined at a time of reproduction from the disk, saturation or smallness of the level of the address signal disables precise determination of the address value. In order to solve such a problem, a gain of a variable gain amplifier may be a feedback-adjusted on the basis of the address signal such that the reproduced address signal indicates a predetermined level. However, a reproduced signal includes an FCM signal component as well as the address signal, and the FCM signal component causes a negative effect on the feedback adjustment. Consequently, the gain of the variable gain amplifier (VCA: Voltage-Controlled Amplifier) is disturbed, and therefore, it is impossible to adequately determine the address value in a decoder.

SUMMARY OF THE INVENTION

Therefore, it is a primary object of the present invention to provide a disk reproducing apparatus capable of precisely determining a value of an address signal reproduced from the disk.

The present invention is disk reproducing apparatus provided with a rotating means for rotating a disk formed and recorded with an address and a predetermined mark along a track, an irradiating means for irradiating a laser beam along the track, a photo-detecting means for detecting a reflection light from the track, a first generating means for generating on the basis of an output from the photo-detecting means a formed and recorded component signal including an address component related to the address and a first predetermined mark component related to the predetermined mark, a gain adding means for adding a gain to the formed and recorded component signal, and an address value detecting means for detecting an address value indicated by the address on the basis of the formed and recorded component signal to which the gain is added, characterized in that the apparatus further provided with a second generating means for generating a second predetermined mark component signal related to the predetermined mark on the basis of an output of the photo-detecting means, an eliminating means for eliminating the first predetermined mark component from the formed and recorded component signal on the basis of the second predetermined mark component signal, a peak level detecting means for detecting a peak level of the formed and recorded component signal from which the first predetermined mark component is eliminated, and a gain adjustment means for adjusting the gain on the basis of the peak level.

In the present invention, when detecting the address value from a reproduced signal (the formed and recorded component signal including the address component related to the address and the first predetermined mark component signal related to the predetermined mark), only the address component is fetched from the formed and recorded component signal. Then, the gain is generated on the basis of the fetched address component so as to be applied to the formed and recorded component signal.

That is, first, the irradiating means irradiates the laser beam onto the disk, and the photo-detecting means detects the reflection light of the laser beam reflected by the track on the disk. The first generating means generates the formed and recorded component signal including the address component related to the address and the first predetermined mark component related to the predetermined mark on the basis of the output from the photo-detecting means. The predetermined mark is a mark such as a fine clock mark (FCM) and etc. which is formed on the track of the disk and having nothing to do with the address. Furthermore, the second generating means generates from the output of the photo-detecting means the second predetermined mark component signal related to the predetermined mark in addition to the formed and recorded component signal.

Then, the gain adding means adds the gain adjusted by the gain adjustment means to the formed and recorded component signal. Then, the address value detecting means detects the address value from the formed and recorded component signal to which the gain is added.

On the other hand, the eliminating means eliminates the first predetermined mark component from the formed and recorded component signal on the basis of the second predetermined mark component signal, and the peak level detecting means detects the peak level of the formed and recorded component signal from which the first mark component is eliminated. Furthermore, the gain adjustment means adjusts the gain to be added to the formed and recorded component signal on the basis of the peak level detected by the peak level detecting means.

Then, as described above, the address value detecting means detects the address signal from the formed and recorded component signal subjected to the gain adjustment on the basis of only the address component.

In another aspect of the present invention, the disk is formed with a concave first track and a convex second track, and the first track is formed with a convex predetermined mark reverse to the shape of the first track, and the second track is formed with a concave predetermined mark reverse to the shape of the second track. Then, the first predetermined mark component signal generated from the predetermined mark of the first track and the second predetermined mark component signal generated from the predetermined mark of the second track are different in polarity.

In a preferable embodiment of the present invention, a first comparison means compares the predetermined mark component signal with a predetermined positive polarity level, and a second comparison means compares the second predetermined mark component signal with a predetermined negative polarity level. Furthermore, a determining means determines whether a track onto which the laser-beam is irradiated is the first track or the second track on the basis of the second predetermined mark component signal. Then, an activating means activates any one of the first comparison means and the second comparison means in accordance with a determination result of the determining means, and a generating means generates an elimination signal for eliminating the first predetermined mark component from the formed and recorded component signal on the basis of a comparison result of any one of the first and second comparison means activated by the activating means.

According to the present invention, even if a signal except for a component of the address signal is included in the formed and recorded component signal reproduced from the disk, the gain of the reproduced signal is adjusted with reference to only the component of the address signal, so that the address value can be detected from the formed and recorded component signal to which the gain is adjusted. Accordingly, it is possible to precisely determine the value of the address signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing an example of each signal to be dealt in FIG. 1 embodiment;

FIG. 7 is an illustrative view showing an example of another signal to be dealt in FIG. 1 embodiment;

BEST MODE FOR PRACTICING THE INVENTION

Figure 1:
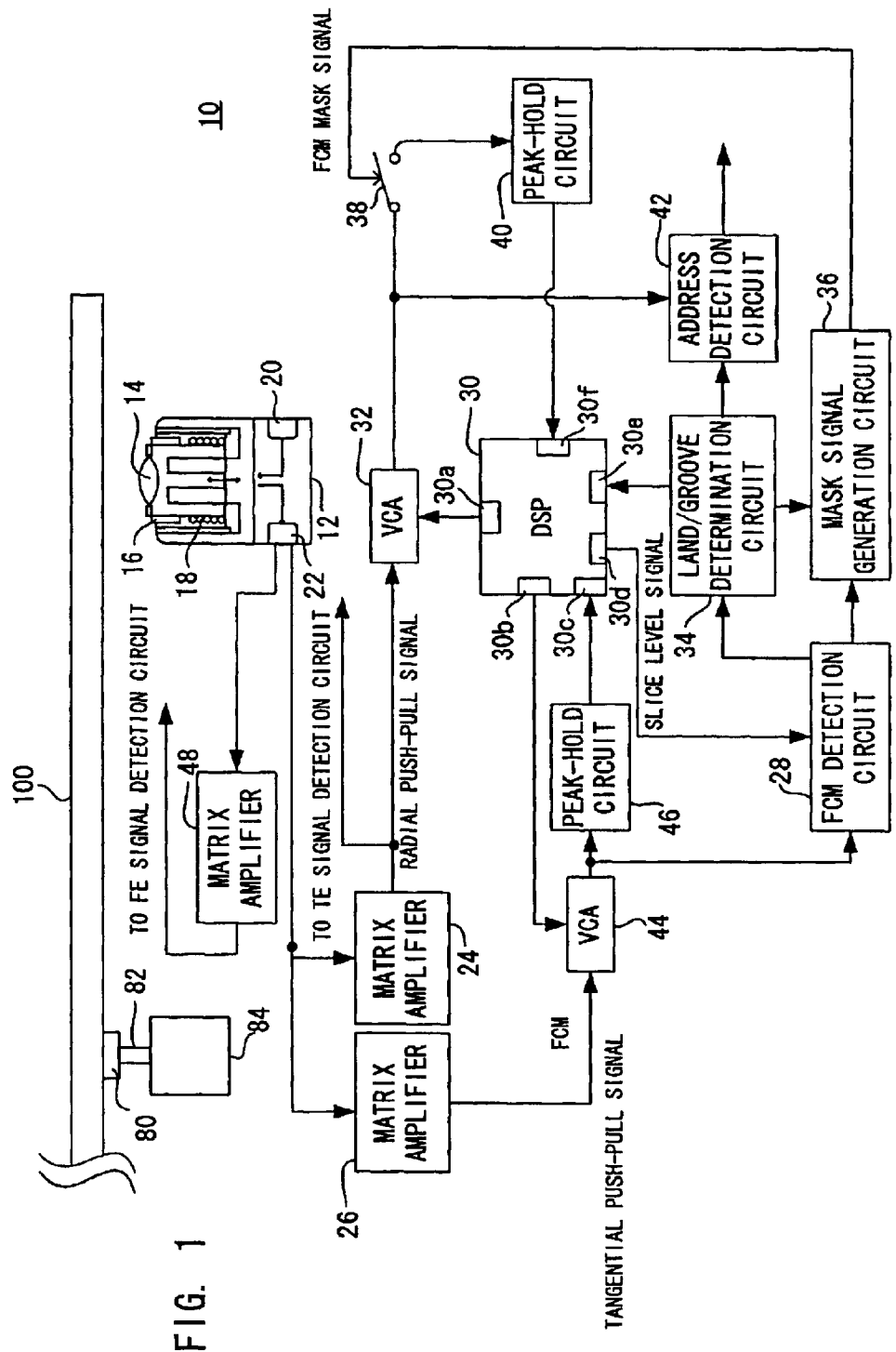
FIG. 1 is a block diagram showing a disk reproducing apparatus of one embodiment of the present invention.

Referring to FIG. 1, an optical disk apparatus 10 of this embodiment includes an optical pickup 12 provided with an optical lens 14. The optical lens 14 is supported by a tracking actuator (not shown) and a focus actuator (not shown). A leaser beam irradiated from a laser diode 20 provided on the optical pickup 12 is converged to the optical lens 14 and irradiated onto a recording surface of a magneto optical disk 100 such as an AS-MO disk and etc. Thus, a desired signal is recorded onto or reproduced from the AS-MO disk 100.

The AS-MO disk 100 is mounted on a spindle 80 connected to a spindle motor 84 by a shaft 82. Then, when the spindle motor 84 is rotated, the rotation transferred to the spindle 80 via the shaft 82 rotates the AS-MO disk 100. The AS-MO disk 100 is a disk in a zone CLV system, and the number of rotations decreases as the optical pick-up 12 is moved from the inner radius to the outer radius. It is noted the number of rotations is constant within a predetermined band.

Figure 9:
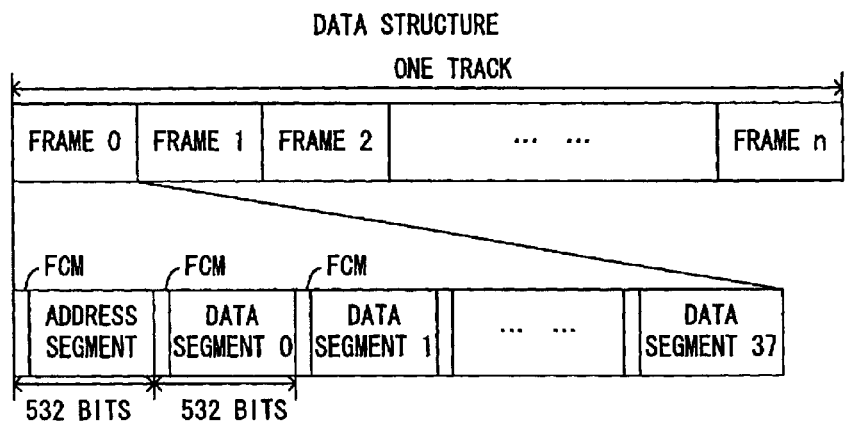
FIG. 9 is an illustrative view showing data structure of data recorded onto a magneto optical disk to be dealt in FIG. 1 embodiment.
Figure 10:
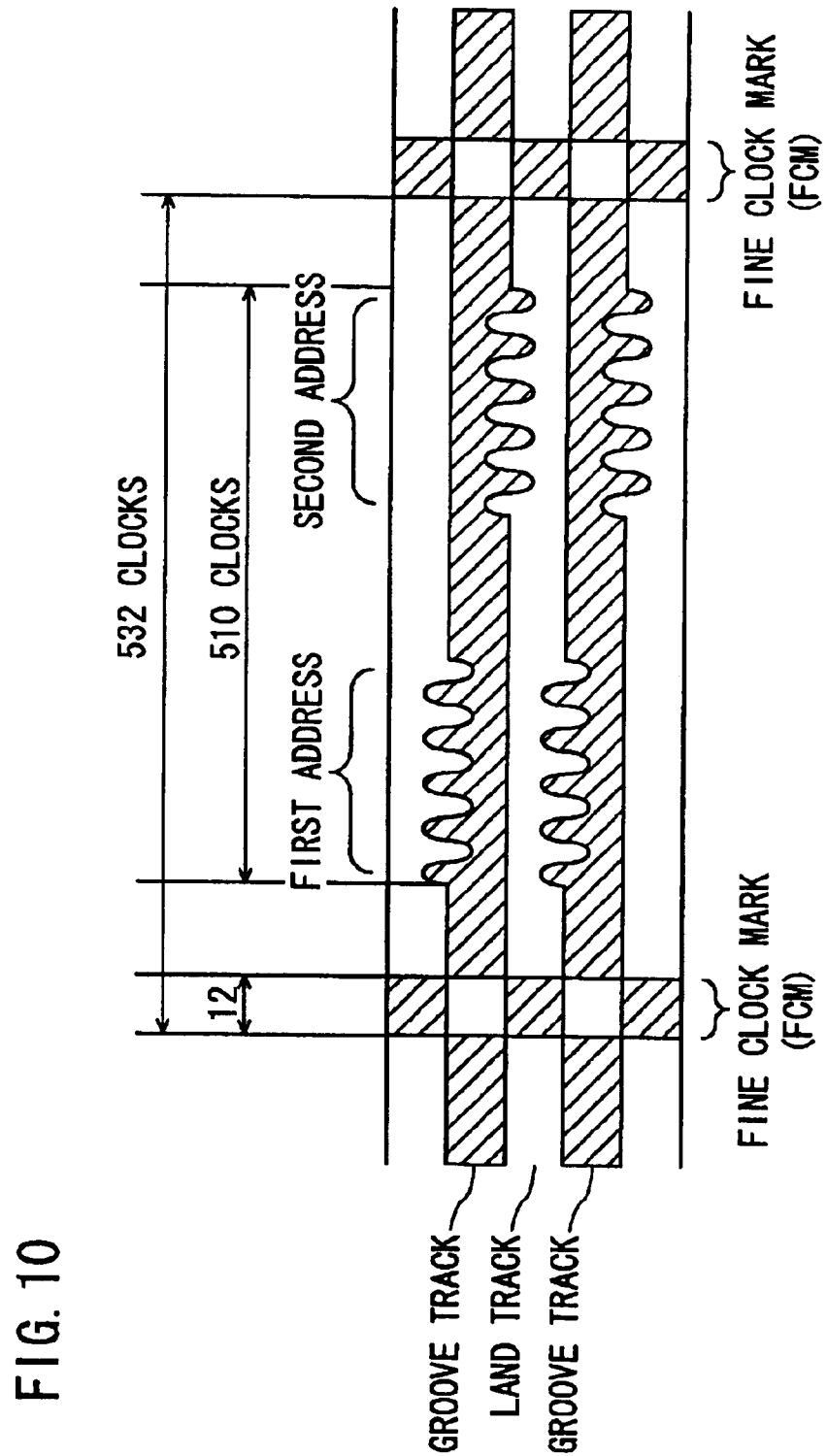
FIG. 10 is an illustrative view showing land/groove tracks and FCMs of the magneto optical disk to be dealt in FIG. 1 embodiment.

The AS-MO disk 100 is alternately formed with a land track and a groove track every one track in a radius direction of the AS-MO disk 100 on its surface as shown in FIG. 10, and each track is formed and recorded with a fine clock mark (FCM) at a predetermined distance. The FCM is formed by embossed bit having a concave and a convex reverse to that of the land track and the groove track. That is, a convex land track is formed with a concave FCM while a concave groove track is formed with a convex FCM. Then, an address segment (see FIG. 9) is provided with an address portion that a boundary surface between the land track and the groove track is formed in a waving shape.

Figure 2:
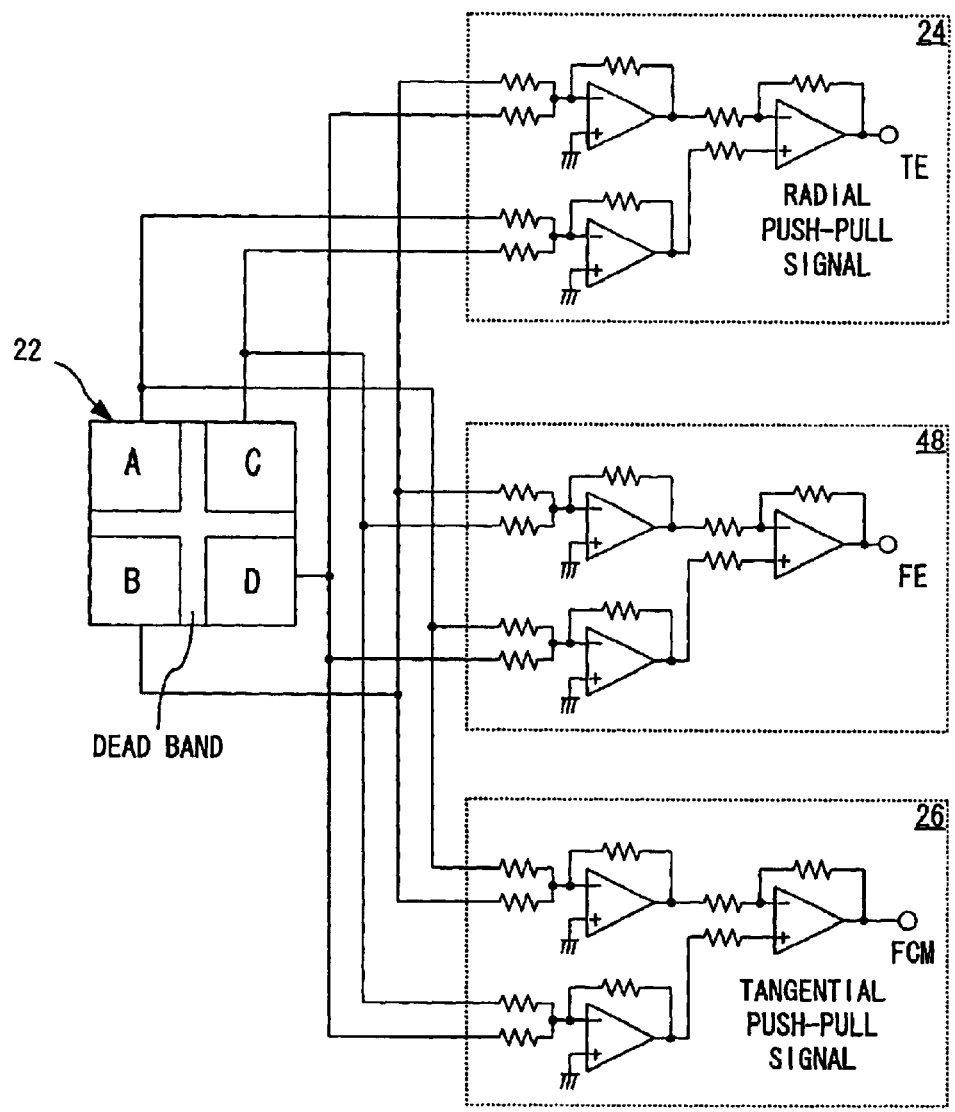
FIG. 2 is an illustrative view showing one part of FIG. 1 embodiment.

A reflection light from such the disk surface is irradiated on a photodetector 22 through the optical lens 14. The photodetector 22 is configured as shown in FIG. 2. The photodetector 22 is formed by four detection elements A, B, C and D. Outputs of these detection elements A to D are subjected to different operations by matrix amplifiers 24, 26 and 48. More specifically, equations 1, 2 and 3 are computed in the matrix amplifiers 24, 48 and 26, respectively. It is noted that "A" to "D" in the equations (1) to (3) are respectively corresponding to the outputs from the detection elements A to D.

$(A+C)-(B+D)$ ... radial push-pull signal    (1)

$(A+D)-(B+C)$    (2)

$(C+D)-(A+B)$ ... tangential push-pull signal    (3)

An output from the matrix amplifier 48 is applied to an FE signal detection circuit (not shown) so as to detect an FE signal. An output from the matrix amplifier 24 is applied to a TE signal detection circuit (not shown) so as to detect a TE signal. A DSP (Digital Signal Processor) 30 executes a focus servo process on the basis of the FE signal and executes a tracking servo process on the basis of the TE signal. The output from the matrix amplifier 24 is also called "radial push-pull signal" from which the address signal is detected, however; a detailed description is made later.

Furthermore, the matrix amplifier 26 generates a fine clock mark signal (FCM signal) on the basis of the reflection light of the FCM (see FIG. 10) formed on the AS-MO disk 100. The signal output from the matrix amplifier 26 is also called "tangential push-pull signal". The FCM signal, when the lesser beam passes along the FCM formed on the land track, changes as shown in FIG. 7(A), and, when the leaser beam passes along the FCM formed on the groove track, changes as shown in FIG. 7(F). That is, the FCM signal generated by the FCM on the land track and the FCM signal generated by the FCM on the groove track are reverse in polarity.

The FCM signal generated by the matrix amplifier 26 is applied to a peak-hold circuit 46 via a variable gain amplifier (VCA) 44. The peak-hold circuit 46 detects a peak level of the FCM signal so as to output a peak-hold signal as shown in FIG. 6. The output peak-hold signal is applied to the DSP 30 via an A/D converter 30c. It is noted that a gain of the variable gain amplifier 44 is controlled by a control signal output from the DSP 30 and through a D/A converter 30b.

Figure 3:
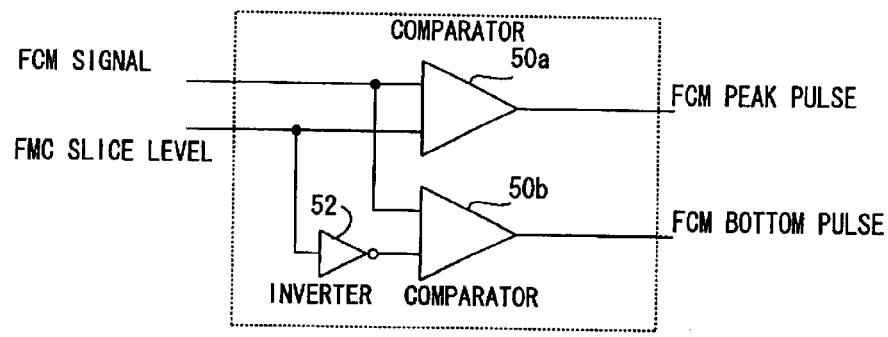
FIG. 3 is an illustrative view showing one example of a configuration of an FCM detection circuit of FIG. 1 embodiment.

The FCM signal output from the variable gain amplifier 44 is also input to an FCM detection circuit 28. A peak pulse of the FCM signal is generated from a slice level signal (see FIG. 6) output from the DSP 30 and through a D/A converter 30d and the FCM signal output from the variable gain amplifier 44 in the FCM detection circuit 28. The FCM detection circuit 28 is specifically configured as shown in FIG. 3, and the slice level signal (peak) output from the DSP 30 and the FCM signal are input to a comparator 50a, and a slice level signal (bottom) to which the slice level signal (peak) output from the DSP 30 is inverted is input to a comparator 50b.

Accordingly, when the FCM signal having a waveform shown in FIG. 7(A) is applied from the variable gain amplifier 44, an FCM peak pulse shown in FIG. 7(B) is output from the comparator 50a, and an FCM bottom pulse shown in FIG. 7(C) is output from the comparator 50b. On the other hand, when the FCM signal having a reverse polarity to that in FIG. 7(A) is applied from the variable gain amplifier 44 as shown in FIG. 7(F), an FCM peak pulse shown in FIG. 7(G) is output from the comparator 50a and an FCM bottom pulse shown in FIG. 7(H) is output from the comparator 50b.

The FCM peak pulse and FCM bottom pulse output from the FCM detection circuit 28 are applied to a land/groove determination circuit 34. The land/groove determination circuit 34 determines whether a current track (track traced by the leaser beam) is a land track or a groove track on the basis of the FCM peak pulse and the FCM bottom pulse and outputs a land/groove determination signal indicative of the determination result to the DSP 30. When the current track is the land track, the FCM peak pulse and the FCM bottom pulse are input to the land/groove determination circuit 34 at a timing shown in FIG. 7(B) and FIG. 7(C) so as to generate a high level determination signal indicative of a land track shown in FIG. 7(D) by the land/groove determination circuit 34. In contrast thereto, when the current track is a groove, the FCM peak pulse and the FCM bottom pulse are input to the land/groove determination circuit 34 at a timing shown in FIG. 7(G) and FIG. 7(H) so as to generate a low level determination signal indicative of the groove track shown in FIG. 7(I). Such the land/groove determination signal is applied to a mask signal generation circuit 36 and an address detection circuit 42 in addition to the DSP 30.

Figure 4:
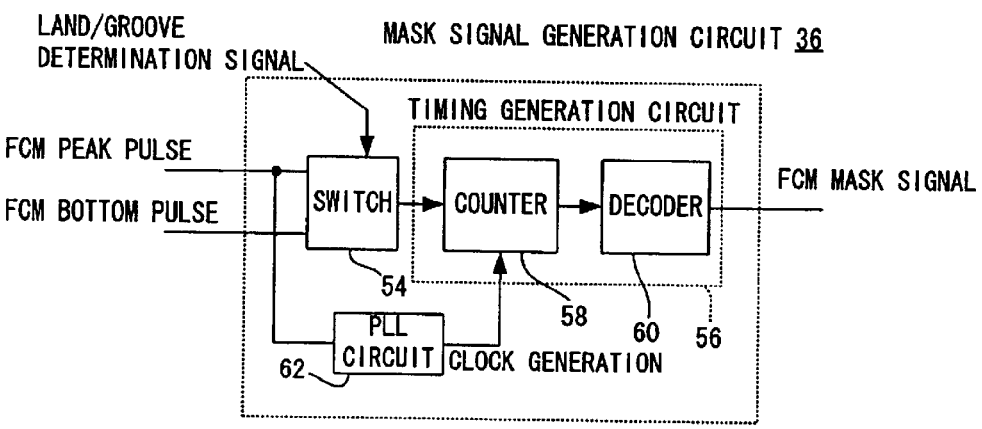
FIG. 4 is an illustrative view showing one example of a configuration of a mask signal generation circuit of FIG. 1 embodiment.

The mask signal generation circuit 36 generates FCM mask signals as shown in FIG. 7(E) and FIG. 7(J) on the basis of the FCM peak pulse and FCM bottom pulse output from the FCM detection circuit 28 and the land/groove determination signal output from the land/groove determination circuit 34. The mask signal generation circuit 36 is specifically configured as shown in FIG. 4, and the FCM peak pulse and the FCM bottom pulse that are output from the FCM detection circuit 28 are input to a switch 54. The switch 54 applies any one of the FCM peak pulse and the FCM bottom pulse to a timing generation circuit 56 in response to an input of the land/groove determination signal. Furthermore, a PLL (Phase Locked Loop) circuit 62 generates a clock reproduction synchronizing with the FCM peak pulse and applies the clock to the timing generation circuit 56. A counter 58 provided in the timing generation circuit 56 is reset in response to a rising edge of the FCM peak pulse or the FCM bottom pulse and incremented in response to the clock applied from the PLL circuit 62. A decoder 60, when a counted value of the counter 58 becomes "15", switches a signal to a low (Low) level, and, when the counted value of the counter 58 becomes "530", switches the signal to a high (High) level. By the way, the switch 54, when the land/groove determination signal indicates the land, selects the FCM peak pulse and, when the land/groove determination signal indicates the groove, selects the FCM bottom pulse so that the FCM peak pulse or the FCM bottom pulse is applied to the counter 58. Accordingly, a mask signal being rendered active during a period that the FCM signal is changed is generated from the decoder 60 as shown in FIG. 7(F) and FIG. 7(J), and the mask signal is output from the mask signal generation circuit 36 to the switch 38.

Meanwhile, the radial push-pull signal output as described above from the matrix amplifier 24 is utilized for address detection in addition to the tracking servo process. The radial push-pull signal is applied to a peak-hold circuit 40 via a variable gain amplifier (VCA) 32 and the switch 38. The peak-hold circuit 40 receiving the radial push-pull signal detects a peak level of the radial push-pull signal so as to output the peak-hold signal. The peak-hold signal output from the peak-hold circuit 40 is applied to the DSP 30 via an A/D converter 30f. The DSP 30 applies a control signal corresponding to the peak-hold signal applied from the peak-hold circuit 40 to the variable gain amplifier 32 via the D/A converter 30a. A gain of the variable gain amplifier 32 is controlled by the control signal. Thus, by feedback controlling the variable gain amplifier 32, depending on a level of the peak-hold signal, an amplitude level of the radial push-pull signal can be kept constant.

Referring to FIG. 7, in a case a center of the width direction of the track is traced by a center of the leaser beam (spot light), a level ((A+C)−(B+D)) of the radial push-pull signal always indicates "0". That is, a change of the concave and convex by the embossed bit of the FCM never appears in the radial push-pull signal. However, the optical pickup 12 traces the track formed in a curved line with an orbit adjustment on the basis of the TE signal, and therefore, the orbit of the optical pick up 12 becomes an orbit winding or meandering from side to side on the read-out track. Thus, the optical pickup 12 traces off the center of the track. When the trace is out of the center of the track, the reflection light by the FCM is not irradiated onto the detection elements A and B and the detection elements B and D equally, and the waveform thereof appears in the radial push-pull signal. Thus, the signal by the FCM appearing in the radial push-pull signal is called "FCM leakage-in signal".

Figure 8:
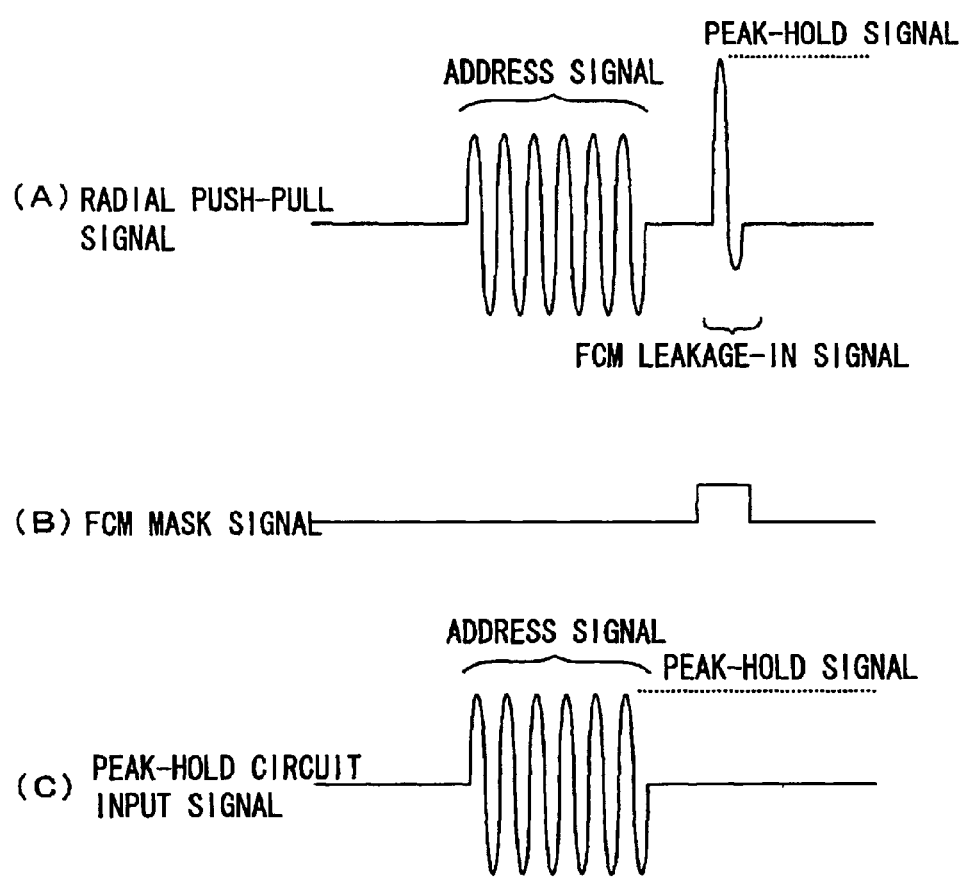
FIG. 8 is an illustrative view showing an example of the other signal to be dealt in FIG. 1 embodiment.

As shown in FIG. 8(A), an amplitude of the FCM leakage-in signal becomes larger than that of the address signal, and therefore, the peak-hold signal output from the peak-hold circuit 40 becomes larger than a natural peak of the address signal. Thereupon, the DSP 30 determines the gain to be applied to the variable gain amplifier 32 to be small, and therefore, the control signal output from the DSP 30 to the variable gain amplifier 32 controls the amplitude of the address signal to an amplitude smaller than that of natural. Herein, in the disk reproducing apparatus of this embodiment, it is possible to prevent the FCM leakage-in signal included in the radial push-pull signal from being input to the peak-hold circuit 40 and obtain the peak-hold signal which normally captures the peak of the address signal as shown in FIG. 8(C). Then, the DSP 30 applies the control signal based on the peak-hold signal to the variable gain amplifier 32 so as to properly control the amplitude of the address signal.

More specifically, the mask signal shown in FIG. 7(E) and FIG. 7(J) is applied from the mask signal generation circuit 36 to the switch 38. The switch 38 is an analog switch formed by a transistor and becomes an ON state when the FCM mask signal is negative and becomes an OFF state when the FCM mask signal is active. That is, although the radial push-pull signal applied from the variable gain amplifier 32 is applied to the peak-hold circuit 40 during a negative period, an input of the radial push-pull signal to the peak-hold circuit 40 is cut-off during a time that the FCM mask signal is active within an active period. This operation of the switch 38 enables only the address signal to be input to the peak-hold circuit 40 as shown in FIG. 8(C), and the peak-hold circuit 40 holds or captures the peak of the address signal and outputs the peak-hold signal to the DSP 30. The DSP 30 outputs the control signal based on an adequate peak-hold signal to the variable gain amplifier 32, and the variable gain amplifier adjusts the amplitude level of the address signal to normal.

Figure 5:
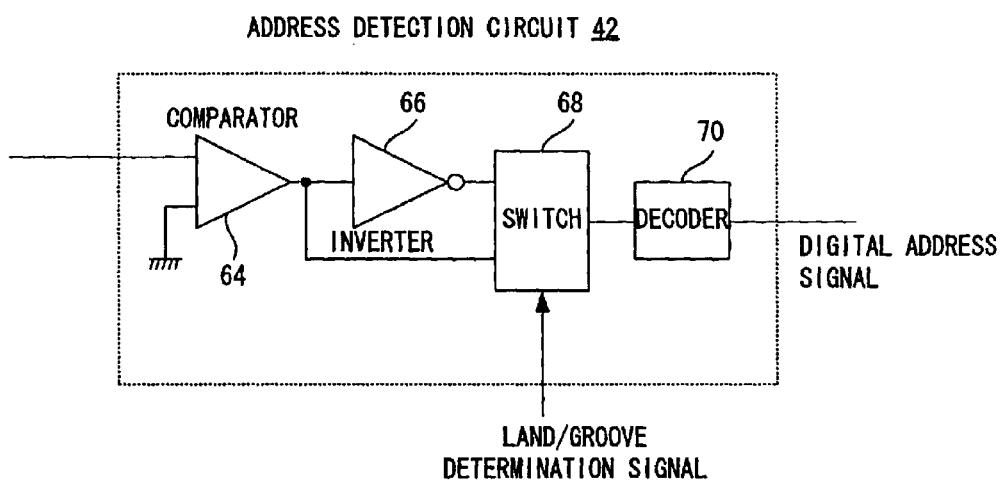
FIG. 5 is an illustrative view showing one example of a configuration of an address detection circuit of FIG. 1 embodiment.

Thus, the address signal adjusted in the amplitude level is applied to the address detection circuit 42. The address detection circuit 42 is configured as shown in FIG. 5. The address signal (TE signal) from the variable gain amplifier 32 is applied to a comparator 64. The address signal is compared with a predetermined threshold value in the comparator 64 so as to be converted into a digital signal. The address signal converted by the comparator 64 is directly output to a switch 68 and also output to the switch 68 via an inverter 66. Furthermore, the switch 68 receives the land/groove determination signal from the land/groove determination circuit 34. Then, the switch 68, when the land/groove determination signal indicates the land track, outputs an inverted address signal inverted by the inverter 66 to a decoder 70 and, when the land/groove determination signal indicates the groove track, outputs the address signal output from the comparator 64 to the decoder 70. A reason why the address signal is applied to the decoder 70 in an inverted manner is that a polarity of the radial push-pull signals is reversed between the land track and the groove track. The address signal applied from the switch 68 to the decoder 70 is a signal encoded by a bi-phase format (Manchester format), and the decoder 70 decodes the bi-phase signal so as to output a decoded address value. Thus, the address value is detected from the radial push-pull signals read from the land track and the groove track.

As can be understood from the above description, it is possible to prevent the FCM leakage-in signal included in the radial push-pull signal from flowing into the peak-hold circuit 40 by the switch 38 in the above-described disk reproducing apparatus of this embodiment. Then, the peak-hold circuit 40 outputs to the DSP 30 the peak-hold value of the address signal included in the radial push-pull signal, and the DSP 30 controls the gain of the variable gain amplifier 32 according to the peak-hold value. Accordingly, it is possible to adjust the amplitude of the address signal without being influenced by the FCM leakage-in signal having an amplitude larger than that of the address signal and precisely determine the address signal. It is noted that on the contrary to occurrence of the leakage-in of the FCM signal to the radial push-pull signal, a leakage-in of the address signal occurs to the tangential push-pull signal. However, the amplitude of the address signal is so small than that of the FCM signal that it cannot reach the slice level of the FCM. Accordingly, it is no need to take occurrence of the leakage-in of the address signal to the tangential push-pull signal into account.

The embodiment of the present invention is not limited to the above-described examples and may be enforced with modification in a variety of ways. For example, a configuration of the mask signal generation circuit 36 shown in FIG. 4 is only one example, and any configuration may be taken for circuits realizing the same function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk reproducing apparatus, comprising:
    a rotating means for rotating a disk formed and recorded with an address and a predetermined mark along a track;
    an irradiating means for irradiating a laser beam along said track;
    a photo-detecting means for detecting a reflection light from said track;
    a first generating means for generating a formed and recorded component signal including an address component related to said address and a first predetermined mark component related to said predetermined mark on the basis of an output from said photo-detecting means;
    a gain adding means for adding a gain to said formed and recorded component signal;
    an address value detecting means for detecting an address value indicated by said address on the basis of said formed and recorded component signal to which said gain is added;
    a second generating means for generating a second predetermined mark component signal related to said predetermined mark on the basis of an output of said photo detecting means;
    an eliminating means for eliminating said first predetermined mark component from said formed and recorded component signal on the basis of said second predetermined mark component signal;
    a peak level detecting means for detecting a peak level of said formed and recorded component signal from which said first predetermined mark component is eliminated; and
    a gain adjustment means for adjusting said gain on the basis of said peak level.

2. A disk reproducing apparatus according to claim 1, wherein
    said disk is formed with a concave first track and a convex second track,
    said predetermined mark along said first track is formed in a convex shape,
    said predetermined mark along said second track is formed in a concave shape, and
    said first predetermined mark component signal corresponding to said first track and said second predetermined mark component signal corresponding to said second track have different polarities with each other.

3. A disk reproducing apparatus according to claim 2, wherein said eliminating means includes a first comparison means for comparing said first predetermined mark component signal with a predetermined positive polarity level, a second comparison means for comparing said second predetermined mark component signal with a predetermined negative polarity level, and a generating means for generating a elimination signal for eliminating said first predetermined mark component on the basis of a comparison result of any one of said first comparison means and said second comparison means.

4. A disk reproducing apparatus according to claim 3, further comprising a determining means for determining whether a current track is said first track or said second track on the basis of said predetermined mark component signal, wherein said second eliminating means includes an activating means for activating any one of said first comparison means and said second comparison means in response to a determination result of said determining means.

5. A disk reproducing apparatus according to any one of claims 1 to 4, wherein said predetermined mark is a fine clock mark.

* * * * *